United States Patent
Nordstrom

(10) Patent No.: US 8,296,609 B2
(45) Date of Patent: *Oct. 23, 2012

(54) SYSTEM AND METHOD FOR SERVICE AVAILABILITY MANAGEMENT

(75) Inventor: Paul G. Nordstrom, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 13/042,882

(22) Filed: Mar. 8, 2011

(65) Prior Publication Data

US 2011/0161744 A1    Jun. 30, 2011

Related U.S. Application Data

(63) Continuation of application No. 11/329,665, filed on Jan. 11, 2006, now Pat. No. 7,904,759.

(51) Int. Cl.
*G06F 11/00* (2006.01)

(52) U.S. Cl. .......... 714/47.1; 714/25; 709/219; 709/224

(58) Field of Classification Search .................. 709/219, 709/224; 714/25, 47
See application file for complete search history.

(56) References Cited

U.S. PATENT DOCUMENTS

| | | |
|---|---|---|
| 4,034,347 A | 7/1977 | Probert, Jr. |
| 4,072,072 A | 2/1978 | Harb |
| 4,077,060 A | 2/1978 | Bodner |
| 4,130,865 A | 12/1978 | Heart |
| 4,141,067 A | 2/1979 | McLagan |
| 4,954,981 A | 9/1990 | Dehner, Jr. et al. |
| 5,131,041 A | 7/1992 | Brunner et al. |
| 5,212,788 A | 5/1993 | Lomet |
| 5,359,724 A | 10/1994 | Earle |
| 5,394,526 A | 2/1995 | Crouse et al. |
| 5,444,819 A | 8/1995 | Negishi |
| 5,519,861 A | 5/1996 | Ryu et al. |
| 5,551,027 A | 8/1996 | Choy et al. |
| 5,623,600 A | 4/1997 | Ji et al. |
| 5,640,554 A | 6/1997 | Take |
| 5,644,751 A | 7/1997 | Burnett |

(Continued)

OTHER PUBLICATIONS

Andersson, M., et al., Admission Control of the Apache Web Server, <http://www.telecom.lth.se/panda/research/publications/m_andersson_nts2004.pdf>, Proceedings of the 17th Nordic Teletraffic Seminar (NTS'17), Aug. 24-27, 2004, pp. 12, Fornebu, Norway.

(Continued)

*Primary Examiner* — Philip Guyton
(74) *Attorney, Agent, or Firm* — Knobbe Martens Olson & Bear LLP

(57) ABSTRACT

A service framework uses importance ranking information in making call decisions and/or wait-time decisions in connection with service requests. Each of the service requests has an importance ranking which reflects the importance of the information provided by the service to a task being performed. The health of a service may be controlled by permitting fewer (or more) service requests to be made to the service when the service is less (or more) healthy. The likelihood of a service request being made to the service may depend on the importance ranking of the service request. When waiting for a response, a determination whether to continue waiting may be made based on the likelihood that the service has failed and based on the importance of the information to the task being performed.

32 Claims, 10 Drawing Sheets

U.S. PATENT DOCUMENTS

| | | |
|---|---|---|
| 5,713,017 A | 1/1998 | Lin et al. |
| 5,796,952 A | 8/1998 | Davis et al. |
| 5,812,529 A | 9/1998 | Czarnik et al. |
| 5,822,529 A | 10/1998 | Kawai |
| 5,826,031 A | 10/1998 | Nielsen |
| 5,841,980 A | 11/1998 | Waters |
| 5,862,346 A | 1/1999 | Kley et al. |
| 5,884,046 A | 3/1999 | Antonov |
| 5,892,914 A | 4/1999 | Pitts |
| 5,892,945 A | 4/1999 | Mirchandaney et al. |
| 5,909,681 A | 6/1999 | Passera et al. |
| 5,920,697 A | 7/1999 | Masters et al. |
| 5,924,096 A | 7/1999 | Draper et al. |
| 5,926,822 A | 7/1999 | Garman |
| 5,974,443 A | 10/1999 | Jeske |
| 5,987,446 A | 11/1999 | Corey et al. |
| 5,987,466 A | 11/1999 | Greer et al. |
| 5,999,610 A | 12/1999 | Lin et al. |
| 6,014,686 A | 1/2000 | Elnozahy et al. |
| 6,088,659 A | 7/2000 | Kelley |
| 6,108,703 A | 8/2000 | Leighton et al. |
| 6,119,165 A | 9/2000 | Li et al. |
| 6,125,365 A | 9/2000 | Nakatsugawa |
| 6,128,647 A | 10/2000 | Haury |
| 6,141,681 A | 10/2000 | Kyle |
| 6,178,439 B1 | 1/2001 | Feit |
| 6,199,099 B1 | 3/2001 | Gershman |
| 6,275,820 B1 | 8/2001 | Navin-Chandra |
| 6,282,548 B1 | 8/2001 | Burner |
| 6,311,265 B1 | 10/2001 | Beckerle et al. |
| 6,400,958 B1 | 6/2002 | Isomursu et al. |
| 6,430,602 B1 | 8/2002 | Kay et al. |
| 6,529,953 B1 | 3/2003 | Van Renesse |
| 6,574,749 B1 | 6/2003 | Parsons |
| 6,594,682 B2 * | 7/2003 | Peterson et al. ............ 718/102 |
| 6,678,674 B1 | 1/2004 | Saeki |
| 6,763,017 B1 | 7/2004 | Buckingham |
| 6,766,370 B2 | 7/2004 | Glommen et al. |
| 6,792,458 B1 | 9/2004 | Muret et al. |
| 6,795,826 B2 | 9/2004 | Flinn |
| 6,816,907 B1 | 11/2004 | Mei et al. |
| 6,891,802 B1 | 5/2005 | Hubbard |
| 6,895,406 B2 | 5/2005 | Fables |
| 6,978,458 B1 | 12/2005 | Ghosh et al. |
| 6,981,029 B1 | 12/2005 | Menditto et al. |
| 6,986,050 B2 | 1/2006 | Hypponen |
| 7,000,013 B2 | 2/2006 | Mei et al. |
| 7,035,921 B1 | 4/2006 | Baker |
| 7,054,867 B2 | 5/2006 | Bosley et al. |
| 7,076,543 B1 | 7/2006 | Kirti et al. |
| 7,099,914 B1 | 8/2006 | Hartmann et al. |
| 7,130,912 B2 * | 10/2006 | Nishikado et al. ............ 709/229 |
| 7,155,493 B1 | 12/2006 | Weber |
| 7,216,154 B1 | 5/2007 | Chow et al. |
| 7,225,362 B2 | 5/2007 | Deily et al. |
| 7,308,649 B2 | 12/2007 | Ehrich et al. |
| 7,325,045 B1 | 1/2008 | Manber |
| 7,523,173 B2 * | 4/2009 | Seki et al. ................. 709/219 |
| 7,523,191 B1 | 4/2009 | Thomas et al. |
| 7,624,047 B1 | 11/2009 | Round |
| 7,676,581 B2 | 3/2010 | Isaacs |
| 7,904,759 B2 * | 3/2011 | Nordstrom ................. 714/47.1 |
| 2001/0037389 A1 | 11/2001 | Fujimori et al. |
| 2002/0091752 A1 | 7/2002 | Firlie |
| 2002/0188522 A1 | 12/2002 | McCall et al. |
| 2003/0018953 A1 | 1/2003 | Aberg |
| 2003/0130982 A1 | 7/2003 | Kasriel et al. |
| 2003/0172054 A1 | 9/2003 | Berkowitz et al. |
| 2003/0212788 A1 | 11/2003 | Wilding et al. |
| 2004/0005873 A1 | 1/2004 | Groenendaal et al. |
| 2004/0158615 A1 | 8/2004 | Keller et al. |
| 2005/0033803 A1 | 2/2005 | Vleet |
| 2005/0064859 A1 | 3/2005 | Kotzin et al. |
| 2005/0102292 A1 | 5/2005 | Tamayo et al. |
| 2005/0137963 A1 | 6/2005 | Ricketts et al. |
| 2005/0273841 A1 | 12/2005 | Freund |
| 2005/0273853 A1 | 12/2005 | Oba et al. |
| 2006/0053334 A1 | 3/2006 | Ingen et al. |
| 2006/0259585 A1 | 11/2006 | Keohane et al. |
| 2007/0088805 A1 | 4/2007 | Cyster |
| 2007/0124446 A1 | 5/2007 | Coulthard et al. |
| 2007/0263650 A1 | 11/2007 | Subramania et al. |
| 2008/0086573 A1 | 4/2008 | Martinez et al. |
| 2008/0263188 A1 | 10/2008 | Awduche et al. |
| 2011/0202924 A1 * | 8/2011 | Banguero et al. ............ 718/103 |

OTHER PUBLICATIONS

Andersson, M., et al., Modelling and Design of Admission Control Mechanisms for Web Servers Using Non-Linear Control Theory, <http://www.telecom.lth.se/panda/research/publications/m_andersson_itcom2003.pdf, Proceedings of ITCom's Conference on Performance and Control of Next-Generation Communication Networks (ITCOM 2003), Sep. 9-10, 2003, pp. 12, Orlando, Florida, U.S.A.

Backward Chaining, The Free On-Line Dictionary of Computing, Oct. 10, 2003.

Barroso, L.A., et al., Web Search for a Planet: The Google Cluster Architecture, IEEE Micro, Mar./Apr. 2003, vol. 23, Issue 2, pp. 22-28.

Demers, A., et al., Epidemic Algorithms for Replicated Database Maintenance, Proceedings of the Sixth Annual ACM Symposium on principles of Distributing Computing, Aug. 10-12, 1987, pp. 1-12, Vancouver, British Columbia, Canada.

Kitatsuji et al., A distributed Real-Time Tool for IP-Flow Measurement, IEEE, 2004.

Mao et al., Cluster-Based Online Monitoring System of Web Traffic, ACM, 2001.

Romeral et al., MIRA: A Distributed and Scalable WAN/LAN Real-Time Measurement Platform, Springer-Verlag Berlin Heidelberg, 2002.

Wessels, D., and K. Claffy, Application of Internet Cache Protocol (ICP), version 2,, National Laboratory for Applied Network Research/ UCSD, <http://icp.ircache.net/rfc2187.txt> [retrieved Jul. 10, 2007], Sep. 1997, pp. 20.

Wessels, D., and K. Claffy, Internet Cache Protocol (IPC), version 2, National Laboratory for Applied Network Research / UCSD, <http://icp.ircache.net/rfc2186.txt> [retrieved Jul. 10, 2007], Sep. 1997, pp. 9 pages.

* cited by examiner

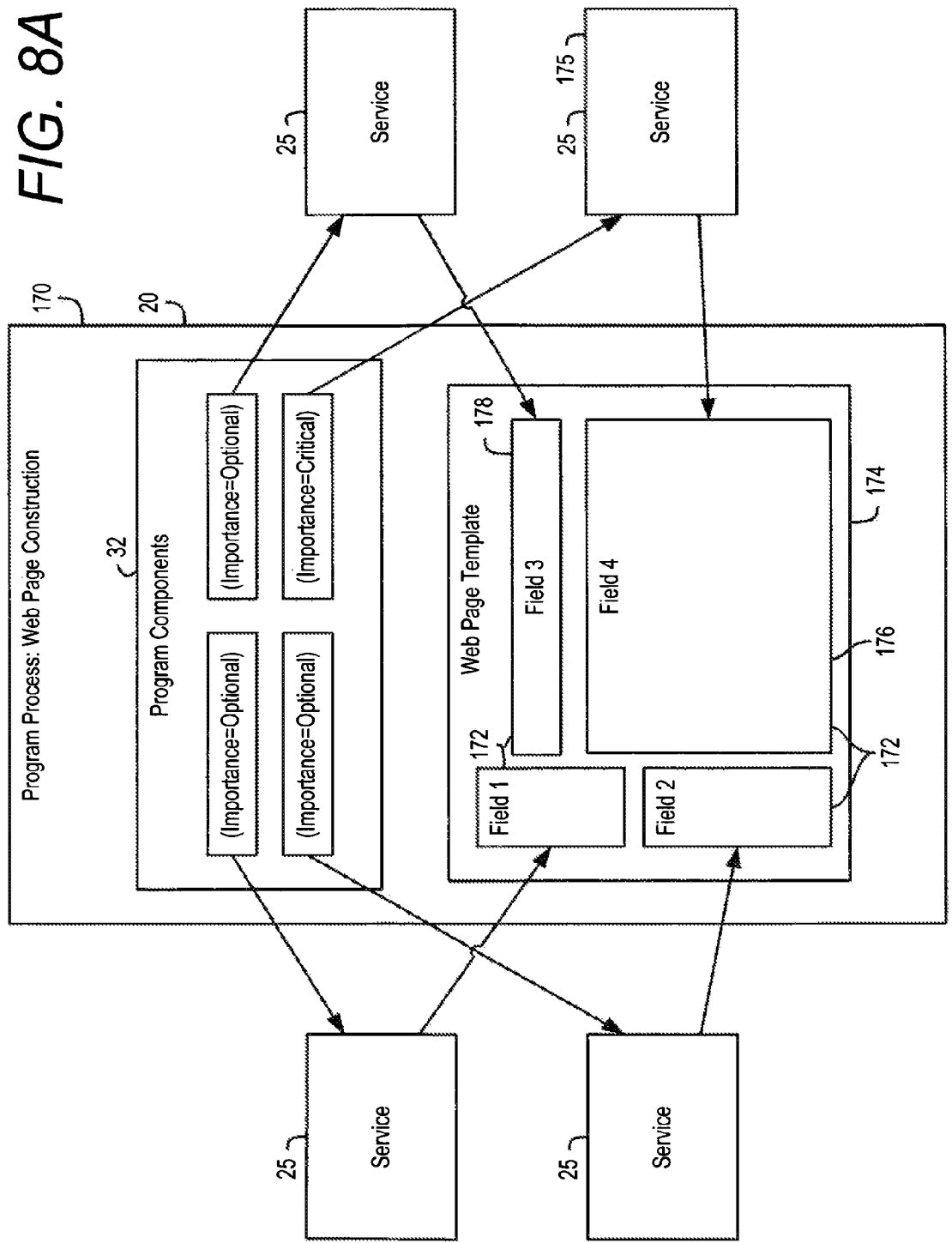

YesterdaysElectronics.com Novelty consumer electronics

*Yesterday's consumer electronics for less.*

178

Welcome! Yesterday's Electronics brings you the best in novelty consumer electronics. <u>Find out more.</u>

Search

Audio & Video
Cameras
Computers
Games
Office Systems
Telephones

Today's Hot Deal: Personal Data Storage

90 Floppies is all it takes to store 128M!!

Home Theater

...and we've got Betamax VCRs, too!

Personal Computing

It's time to start using a simpler operating system!

Personal Communications

Cellphones from the days when bigger was better

Business Information Systems (Paper not included)

*FIG. 8C*

SYSTEM AND METHOD FOR SERVICE AVAILABILITY MANAGEMENT

CROSS-REFERENCE TO RELATED APPLICATION

This application is a continuation of U.S. patent application Ser. No. 11/329,665, filed Jan. 11, 2006, the entirety of which is incorporated herein by reference.

BACKGROUND

Data processing systems often comprise service frameworks in which program processes send service requests to services, and the services subsequently reply with responses. For example, a process may request certain data from a service, and the service may respond with the requested data. In some situations, program processes may make many service requests in parallel and wait for responses from each of multiple different services.

Various types of events may occur within a service framework that may lead to a degraded performance mode. A degraded performance mode may involve a situation in which a service is merely troubled, a situation in which the service has failed, or a situation in which some other problem exists. For example, a service may become overloaded (causing intermittent or slow responses), may become completely inoperative, may become unreachable due to network problems, and so on. In the event of a failure mode, the process may slow to a standstill as it continues to wait for the response from the service. Typically, it may not be known whether the service has failed or whether it is merely slow in returning a response. At some point, a decision needs to be made as to how long the process should wait for the response from the service.

Accordingly, a problem that has been encountered in the context of service frameworks is to provide a mechanism for program processes to decide how long to wait for a response from a service in situations where the service may have entered a failure mode or other degraded performance mode. Also, oftentimes, services enter a failure mode as a result of becoming overloaded. Accordingly, another problem that has been encountered is to provide a mechanism that avoids services becoming overloaded. It will be appreciated that while the teachings herein describe certain features and advantages that may be achieved, the teachings herein may be used to implement systems and methods that do not necessarily have any of these features or advantages, but rather have other features and advantages.

SUMMARY OF THE INVENTION

One embodiment of the invention relates to a data processing method for use in a service framework. The method comprises receiving first and second assessments of a service. The first assessment comprises an assessment of a relative state of health of the service, and the second assessment comprises an assessment of a relative importance of the service to a task being performed. The method further comprises mediating access to the service according to the first and second assessments.

Another embodiment of the invention relates to a data processing method for use in a service framework. The method comprises sending a service request to a computer-implemented service and waiting for a response from the service. A determination whether to continue waiting for the response is made based on the likelihood that the service has failed and based on the importance of the information to a task being performed.

Another embodiment of the invention relates to a data processing method for use in a service framework. The method comprises controlling the health of a service, including monitoring the health of the service, permitting fewer service requests to be made to the service when the service is less healthy, and permitting more service requests to be made to the service when the service is more healthy. Each of the service requests has an importance ranking which reflects the importance of the information provided by the service to a task being performed. During the controlling step, the service requests with a higher importance ranking are more likely to be made to the service and the service requests with a lower importance ranking are less likely to be made to the service.

Another embodiment of the invention relates to a data processing method for use in a service framework comprising a plurality of computer-implemented services. The method comprises causing the services to operate at or near a maximum service request processing capacity of the services. The causing step includes controlling a flow of service requests to the services, including, for each service, monitoring the health of the service, permitting fewer service requests to be made to the service when the service is less healthy, and permitting more service requests to be made to the service when the service is more healthy.

BRIEF DESCRIPTION OF THE DRAWINGS

FIG. 8A is a block diagram of a data processing system that generates web pages according to an exemplary embodiment, and FIGS. 8B-8C are screen shots showing web pages that may be generated by the system of FIG. 8A.

DETAILED DESCRIPTION OF THE EXEMPLARY EMBODIMENTS

Figure 1:
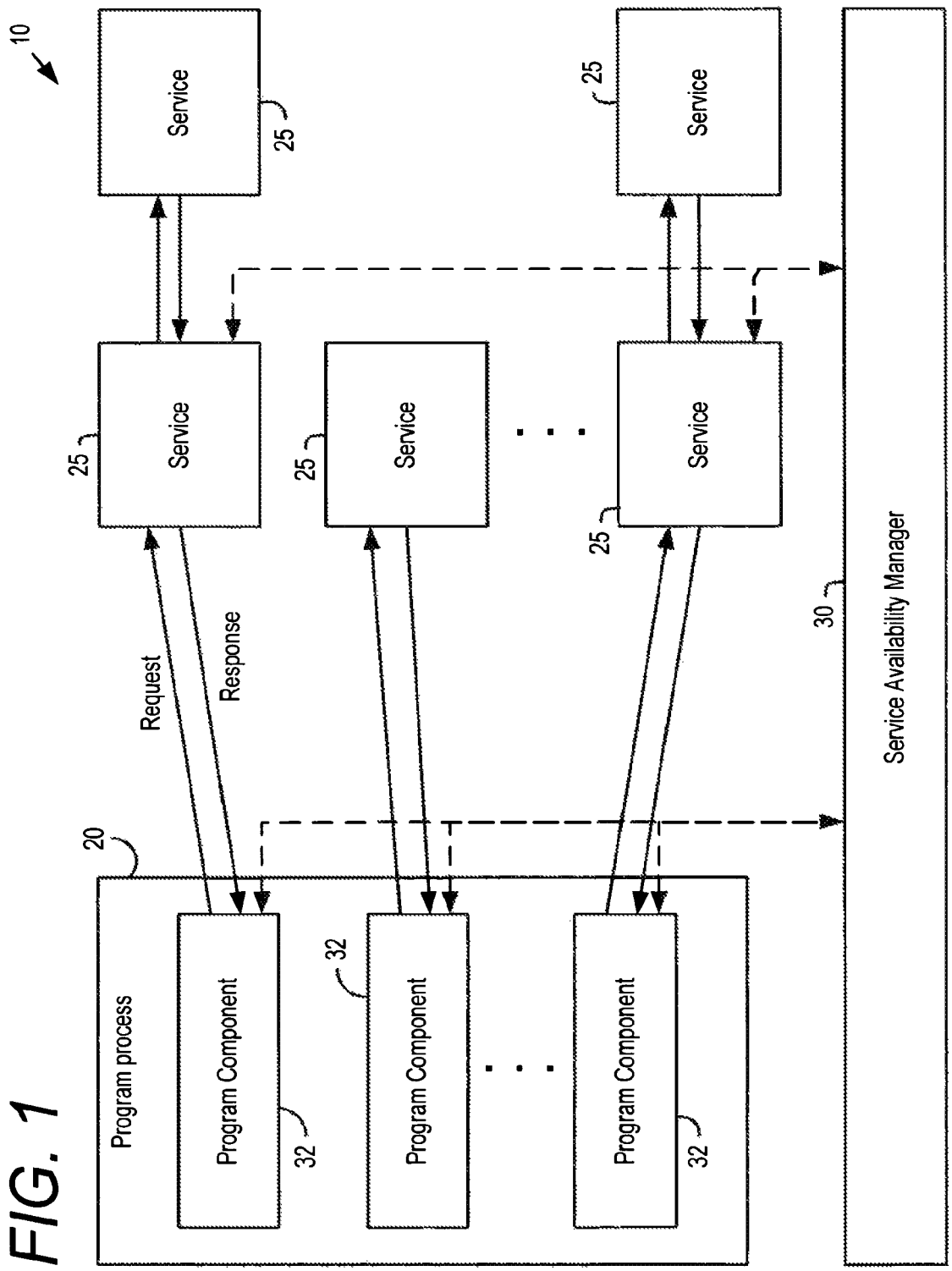
FIG. 1 is a block diagram of a data processing system according to an exemplary embodiment.

Referring to FIG. 1, a data processing system 10 is shown which includes a program process 20, a plurality of services 25, and a service availability manager 30. The process 20 comprises program components 32 which make service requests to the services 25. The services 25 respond with responses, such as responses containing requested data. As shown in FIG. 1, program components 32 may make many service requests to many services 25, such that the process 20 is waiting for many responses at the same time.

The data processing system 10 may be implemented in the context of a service framework in a distributed computing environment. Although only a single process 20 and a small number of services 25 are shown, it will be appreciated that the system 10 may comprise many program processes and services in addition to those shown. Herein, to facilitate explanation, the term "process" is used to refer to program logic that makes a service request and the term "service" is used to refer to program logic that responds to the service request. As will be appreciated, however, services may also make requests to other services (as shown in FIG. 1). Accordingly, program logic that is considered a service in some contexts may be considered a process in other contexts and vice versa.

The process 20 and the services 25 are in communication with the service availability manager 30. The service availability manager 30 is configured to manage the interaction of the processes 20 with the services 25, including determining when processes 20 should stop waiting for responses from services 25, determining when service requests should not be sent to services 25 (e.g., because the service 25 is in a degraded performance mode), and otherwise managing situations in which one of the services 25 has entered a degraded performance mode (e.g., when a service 25 becomes inoperative, overloaded, unreachable, and so on), all on a case-by-case basis.

Figure 2:
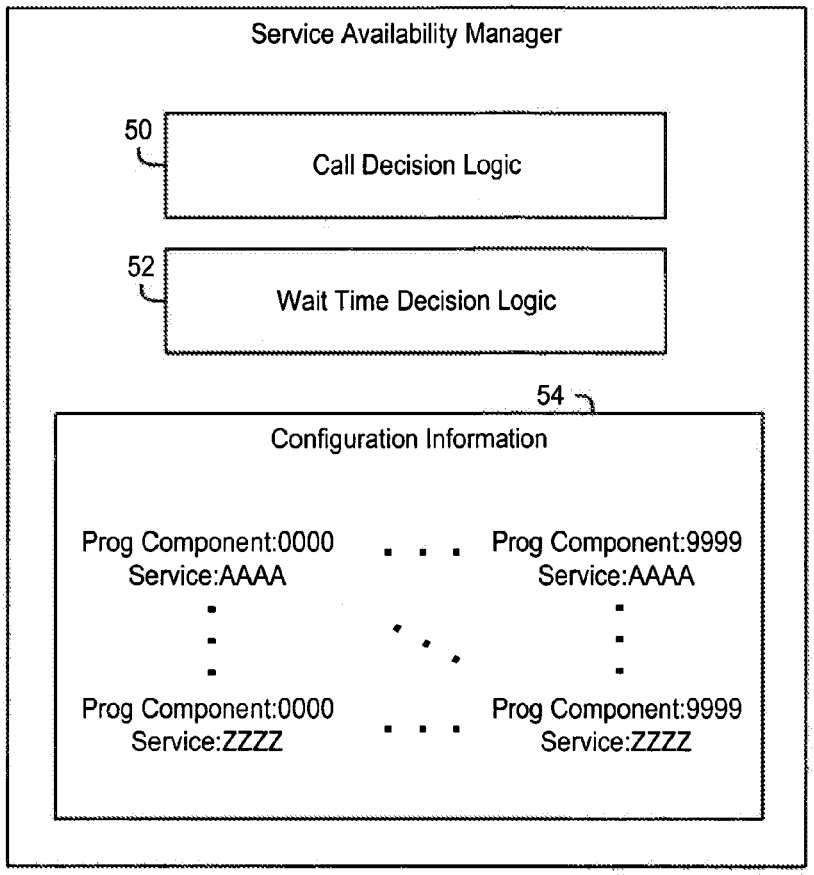
FIG. 2 is block diagram of a service availability manager of the system of FIG. 1.

Referring now to FIG. 2, in an exemplary embodiment, the service availability manager 30 comprises call decision logic 50, wait-time decision logic 52, and configuration information 54. The call decision logic 50 is configured to determine whether a service request should be permitted to be made to a service 25 based on the level of importance of the service request and based on the health of the service 25 to whom the service request is directed. The wait-time decision logic 52 is configured to decide when a process 20 should stop waiting for a response to be received from a service 25.

The configuration information 54 is used to configure the call decision logic 50 and the wait-time decision logic 52. In an exemplary embodiment, the call decision logic 50 and the wait-time decision logic 52 may be configured differently (e.g., different algorithms and/or parameters thereof) for each service 25 and for each different program component 32 within each different process 20 that sends service requests to a particular service 25. For example, when one program component 32 sends a service request to a particular service 25, the configuration information that is used may be different than when another program component 32 sends a service request to the same service 25. The configuration information may also be configurable as a function of other parameters. For example, if the same process 20 is used in the context of different users (e.g., different customers), the configuration information may further be different for each different user. In another exemplary embodiment, in the context of a process 20 that is used to construct web pages for publication to visitors of a website, the configuration information 54 may be different for each different page of the website. The configuration information 54 may also be dynamically determined, e.g., based on visitor feedback, based on system optimization algorithms, and soon.

Figure 3:
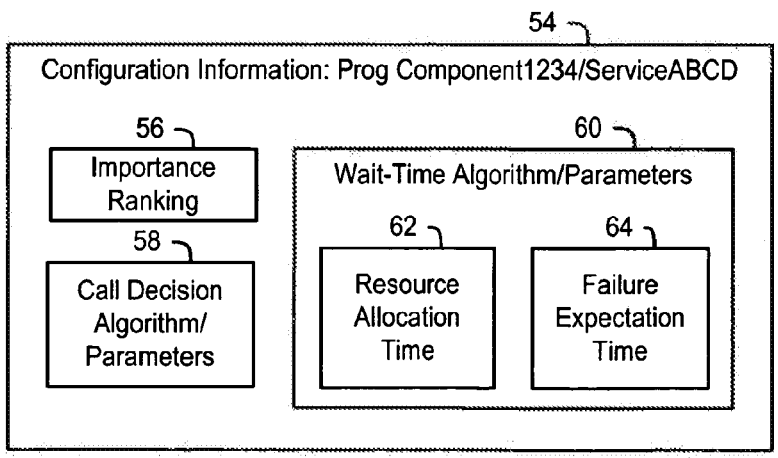
FIG. 3 is a block diagram of configuration information stored in the service availability manager of FIG. 2.

Referring now to FIG. 3, the configuration information 54 is shown in greater detail. The configuration information 54 is shown to include importance ranking information 56, call decision algorithm/parameter information 58, and wait-time algorithm/parameter information 60.

The importance ranking information 56 represents how critical the service request is to the program component 32 that is making the service request. The importance ranking information 56 may be manually specified during creation/maintenance of the program components 32, may be system-specified based on system optimization algorithms, or may be determined in another manner.

Different service requests may have different levels of importance. For example, some data may be considered optional in nature. That is, the process 20 may produce useful results without the optional data. Further, data that is considered optional in some contexts may be considered critical in other contexts, depending on the desired output that is desired to be produced in each case. For example, in the context of the operation of a website, such as an interactive commerce website, information concerning a visitor to the website may be considered optional when displaying a welcome page to the visitor, but may be considered critical when displaying a checkout page to be used in connection with taking an order from the visitor, even though the same service request may be used for both. In the context of a welcome page, if the welcome screen is to be displayed within a predetermined period of time, it may be desirable to forego the optional data in order to permit the page to be displayed in time to meet the deadline. On the other hand, in the context of the checkout page, it may be desirable to continue waiting in order to obtain the information needed for the checkout page.

In an exemplary embodiment, a binary ranking scheme is used to rank importance (e.g., "critical/non-critical"). Thus, if a particular piece of information is considered optional to the task being performed by a particular program component 32, that information may be designated as non-critical. In another exemplary embodiment, a continuous ranking scheme may be used. For example, the importance ranking may be assigned a value anywhere between zero and one so that there are an infinite number of options (e.g., the importance ranking may be specified with a floating point value).

The importance ranking information 56 provides an intuitive mechanism for specifying the value of the data provided by one service relative to the value of the data provided by other services in the context of a particular task being performed by a particular program component. In the context of a system in which multiple service requests may be made in parallel, the parameter of interest in some instances may not be the amount of time a service request takes to complete, but rather how long the framework should wait for its completion if the service 25 is not responding. For example, if the process 20 is already waiting for more important information, then it may be desirable for the process 20 to continue waiting for less important information, even though the service 25 that is providing the less critical information is taking longer than expected. On the other hand, if the process 20 is only waiting for other optional information, it may be desirable to stop waiting for the response in order to permit the process 20 to complete its task in less time. Likewise, if a deadline for completing a task is about to expire, it may be desirable for the process 20 to stop waiting for optional information so that it can produce its result prior to expiration of the deadline.

The call decision algorithm/parameter information 58 may be used to configure the call decision logic 50, so that the call decision logic 50 may be configured differently depending on which service 25 is being called and depending on which program component 32 is calling the service 25. The information 58 may be used to specify the decision algorithm to be used by the call decision logic 50, the parameters (e.g., coefficients) to be used by a generic call decision algorithm implemented by the call decision logic 50, or a combination thereof (e.g., a selection of one of a number of generic algorithms, along with parameters for the selected algorithm). Thus, the call decision logic 50 may be customized for each different service request by a given program component 32.

Likewise, the wait-time decision algorithm/parameter information 60 may be used to configure the wait-time decision logic 52, so that the wait-time decision logic 52 may be configured differently depending on which service 25 is being called and depending on which program component 32 is calling the service 25. Again, the information 60 may be used to specify the decision algorithm and/or the parameters (e.g., coefficients) to be used by the call decision logic 50.

Figure 4:
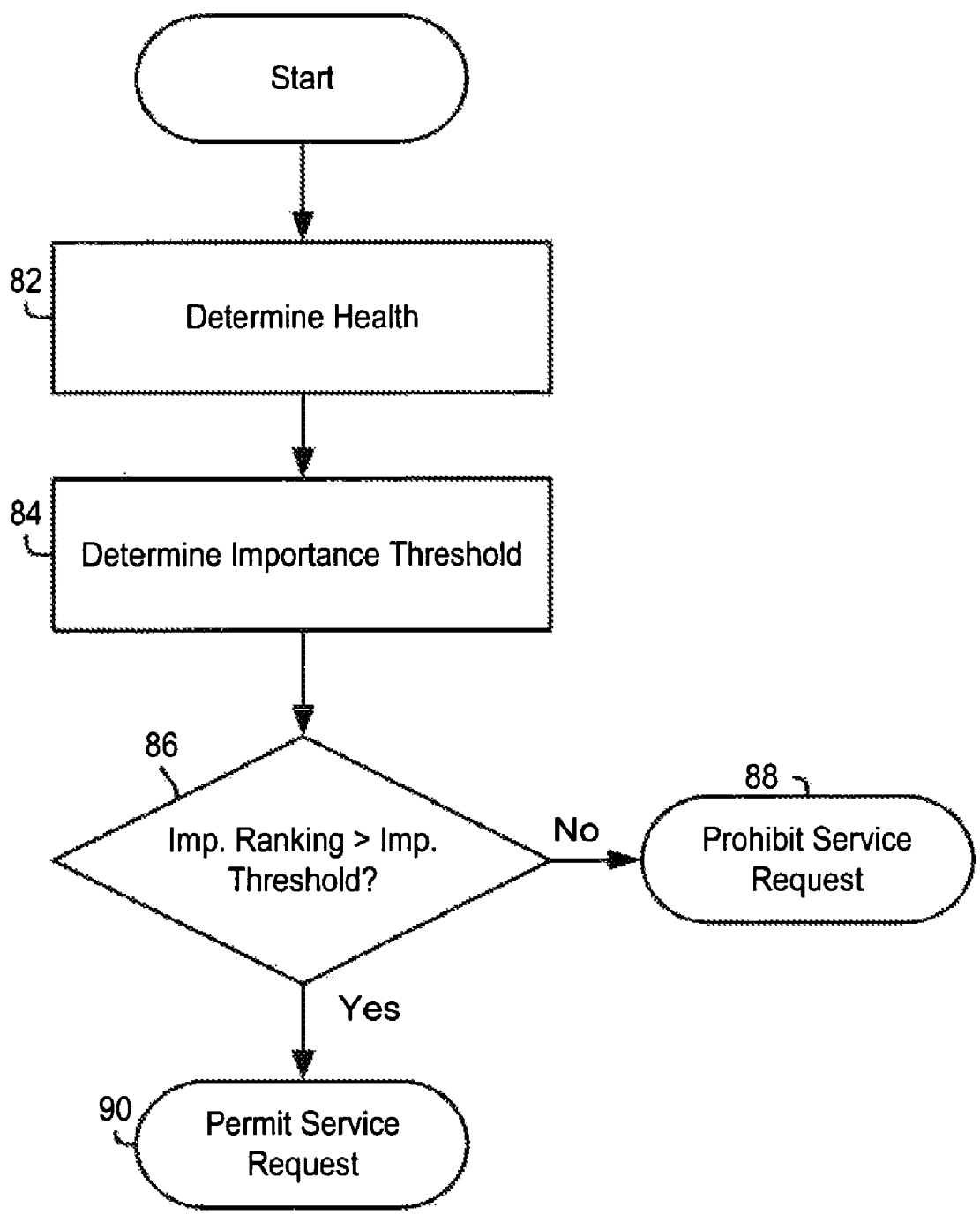
FIG. 4 is a flowchart showing operation of call decision logic of FIG. 2.

Referring now to FIG. 4, a flowchart showing operation of the call decision logic 50 is shown. As previously indicated, the call decision logic 50 is configured to determine whether a service request should be permitted to be made to a service 25.

At step 82, the health of the service 25 is determined. The health of the service 25 may be determined in a variety of manners and taking into account any available information, including statistical information, contextual information, manually-provided information, and so on. In an exemplary embodiment, the health of the service 25 is determined based on historical statistics from communications with the service 25. For example, the health of the service 25 may be determined by measuring the response time of the service 25 and comparing the response time against historical values. For example, the response time of the service 25 may be measured over a relatively short preceding time period and over a relatively long preceding time period. The ratio of the two measurements may then be taken to yield a value indicating the health of the service 25. Thus, if the ratio is close to one, the service 25 may be assumed to be operating at normal health. On the other hand, if the service 25 is responding much slower now than usual, the ratio will be smaller, indicating that the service 25 is less healthy. Each measurement may be made, for example, by using an exponentially decaying mean latency computation for each time period.

In another exemplary embodiment, the health of the service 25 may be determined based on whether the service 25 has not responded to a predetermined number of recent service requests. For example, if the service 25 has not responded to the five most recent service requests, then the service 25 may be assumed to be not healthy. In another exemplary embodiment, the health may be determined based on a message from the service 25 indicating that the service 25 is not healthy. For example, the service 25 may compute its own health and provide its health measurement to the availability manager 30. Thus, the health may be determined by examining service-side information or client/process-side information. As another example, the service 25 may be configured to respond to a request asking the service about the status of its health. For example, if a service request has not recently been made to a particular service 25, such that response time measurements are no longer up to date, a service request may be sent to the service 25 inquiring as to the health of the service 25. The service 25 may then respond with an indication whether it is healthy.

In another exemplary embodiment, the health of the service 25 may be determined based on manually-provided information. For example, a system operator may manually provide an indication that a service 25 appears to be in poor health. As another example, a system operator may manually provide information indicating that a service 25 is to be taken offline during a predetermined time period for system maintenance. The health of the service 25 may also be determined based on information obtained from an external system, e.g., such as a computer system configured to periodically assess the health of one or more of the services 25.

In another exemplary embodiment, the health of the service 25 may be determined based on the health of related services or hardware components. For example, if a hardware component hosts several other services, and each of the other services is in poor health, then the poor health of the other services may be used as a predictor of the health of the service 25 under consideration. As another example, if ten hardware components (e.g., servers) are located in one data center, and services associated with nine of the hardware components are determined to be in poor health, then that may be used as an indication that a service 25 hosted by the tenth hardware component may also be in poor health. In another exemplary embodiment, a statistic collection algorithm may be employed to determine the health of the service 25 based on whatever statistics are available. For example, any unusual performance metric that is noticed by a process or hardware component (e.g., server) concerning a service 25 may be reported and used to assess the health of the service 25. Algorithms may be dynamically implemented which are configured to utilize the information noticed by the process or hardware component.

The algorithm used to determine health may be different for each program component 32 and for each service 25 and may be included as part of the configuration information 54. In another exemplary embodiment, multiple algorithms are used to compute health, and the performance of each algorithm is scored to determine which health algorithm provides the best results over time. The algorithm that scores the highest is then used until another algorithm is introduced which scores higher.

As previously noted, the system 10 may be implemented in a distributed computing environment. In such an arrangement, it may be desirable for each hardware component (e.g., each server) to compute a health value for a given service 25. This allows performance information for a given service 25 to be shared by all program components 32 executing on a given hardware component. A single program component 32 may not always have enough performance information for a service 25 to compute a reliable health value for the service 25. At the same time, this allows each of the hardware components to compute a health value for the service 25 independently of the health values computed for the same service 25 by other hardware components. Because slow or non-existent responses from services 25 may sometimes be caused by client/process-side hardware problems, different hardware components may perceive the health of a given service 25 differently than other hardware components. This allows specific problems that are perceived at one hardware component but not others to be taken into account in the health computation. In another exemplary embodiment, a single health value is computed for some or all hardware components (i.e., to encapsulate the health of a group of hardware components in one health value). It may be desirable to use this arrangement where each hardware component does not send service requests to a given service 25 frequently enough to have reliable health information for the service 25, but where in the aggregate the hardware components do have reliable health information.

Figure 5:
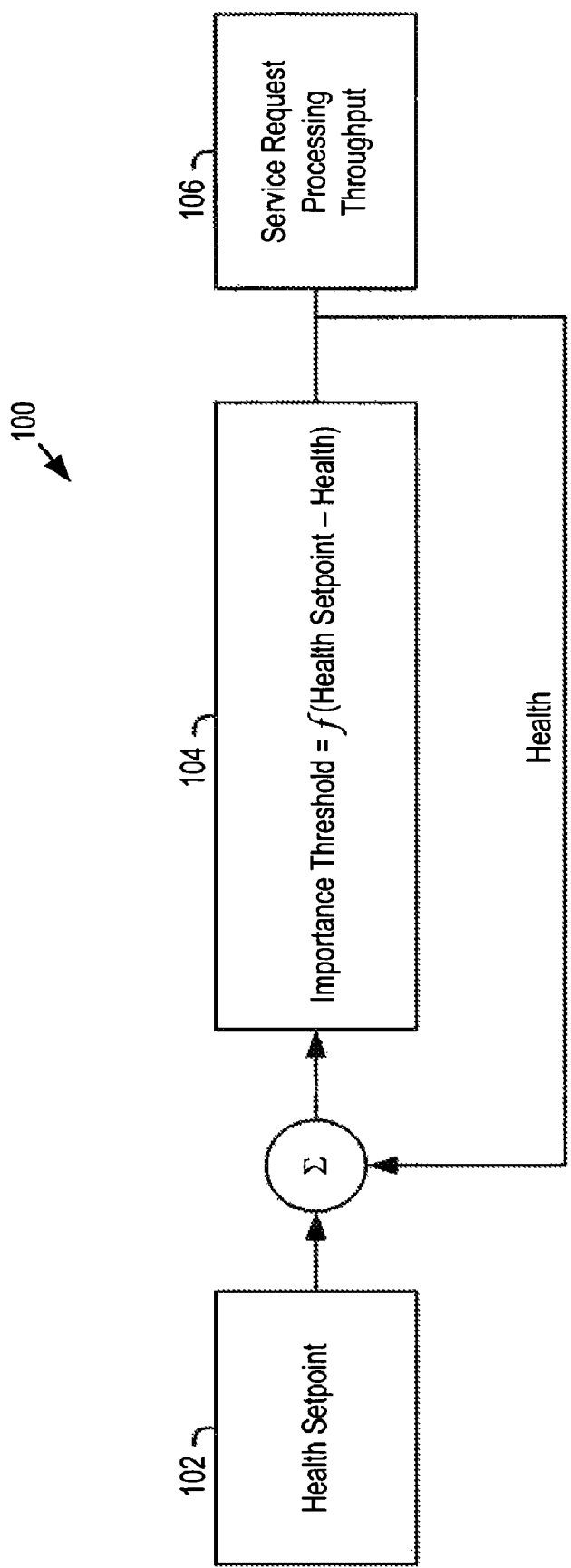
FIG. 5 is a block diagram showing a negative feedback control loop implemented by the call decision logic of FIG. 2.

At step 84, an importance ranking threshold is determined. Referring now also to FIG. 5, an exemplary mechanism for determining the importance ranking threshold is shown. FIG. 5 shows a feedback control loop 100 that is used to maintain the health of a service 25 at an optimal level. The feedback control loop 100 receives a health setpoint 102 which is compared with the actual health of the service 25. A transfer function 104 then determines the importance threshold as a function of the difference between the health setpoint and the actual health of the service 25. For example, if the actual health of the service 25 is relatively high (and close to the health setpoint), then the importance threshold may be relatively low. As a result, the service 25 receives service requests of both higher and lower importance. On the other hand, if the actual health of the service 25 is relatively low (and not close to the health setpoint), then the importance threshold may be set at a higher value. As a result, the service 25 may only receive service requests of higher importance.

Referring again to FIG. 4, at step 86, a decision is made whether to permit a service request to the service 25 based on whether the health is above or below the importance threshold. If the importance ranking is below the importance ranking threshold, then the service request is not permitted (step 88). On the other hand, if the importance ranking is above the importance ranking threshold, then the service request is permitted (step 90). The decreased loading on the service 25 permits the health of the service 25 to improve and permits service request processing throughput 106 to increase.

In other exemplary embodiments, the call decision logic 50 may operate in another manner. For example, a particular process or hardware component may be given a quota for accessing a service 25 (e.g., one-hundred service requests per second). The call decision logic 50 may then operate to ensure that the process or hardware component allocates its quota first to critical service requests and only thereafter then to non-critical service requests. In such an embodiment, the quota may be determined in advance, or it may be determined dynamically by the service 25 based on its own assessment of its health (e.g., the service 25 may adjust the quota downward when its health deteriorates). The service 25 may also be configured to send a message indicating when the process or hardware component has exceeded its quota. Alternatively, the fact that the service 25 is not responding to service requests when the quota is exceeded may be used by the service 25 as an indication that the process or hardware component may be in poor health, causing the importance threshold to increase and thereby fewer service requests to be made.

Thus, in the arrangement of FIGS. 4-5, if there is statistical evidence that a service 25 is in trouble, then less critical service requests may not be sent to the service 25. The decision whether or not to permit a service request to be made to the service 25 impacts loading of the service 25. If a service 25 is already overloaded, the decision not to permit the service request protects the service 25 from taking on additional load which may cause the service 25 to fail. Thus, the arrangement of FIGS. 4-5 protects the service 25 by avoiding putting additional loading on the service 25 when the service 25 is not fully healthy. In steady state, the service 25 operates at maximum capacity. If it starts taking on too much load, the response times deteriorate and the health decreases, resulting in fewer service requests being made. Thus, the negative feedback causes reduced loading and causes the service to return to a more optimum health condition. In steady state, this arrangement controls the flow of service requests so as to cause the services and hardware components to process service requests at maximum capacity. Additionally, the decision whether or not to permit a service request to be made to the service 25 impacts whether resources are allocated trying to communicate with a service 25 that has failed.

Figure 6A:
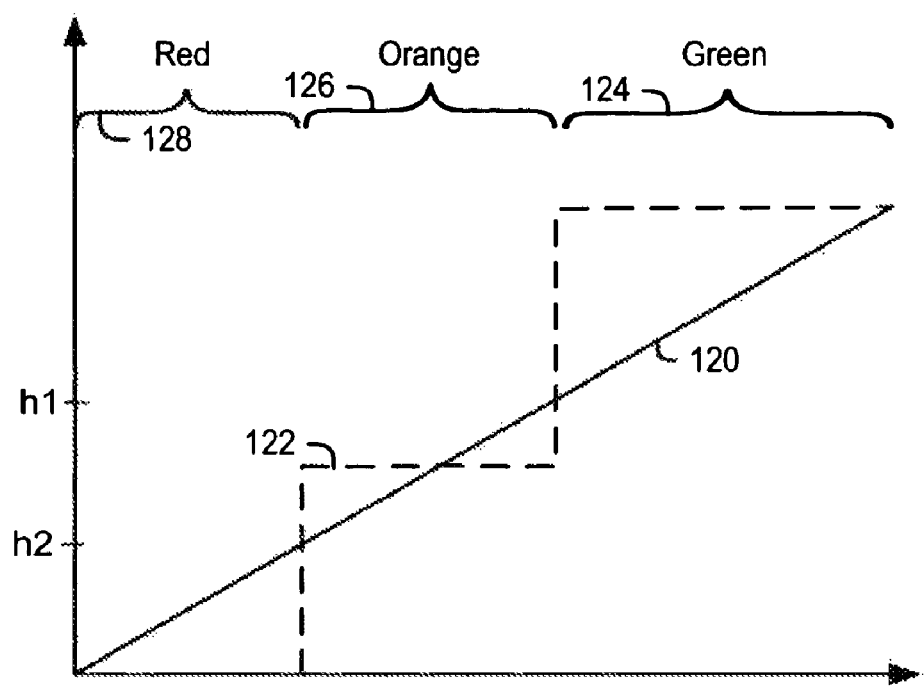
FIGS. 6A-6B are graphs showing modes of operation of a service under different health conditions.
Figure 6B:
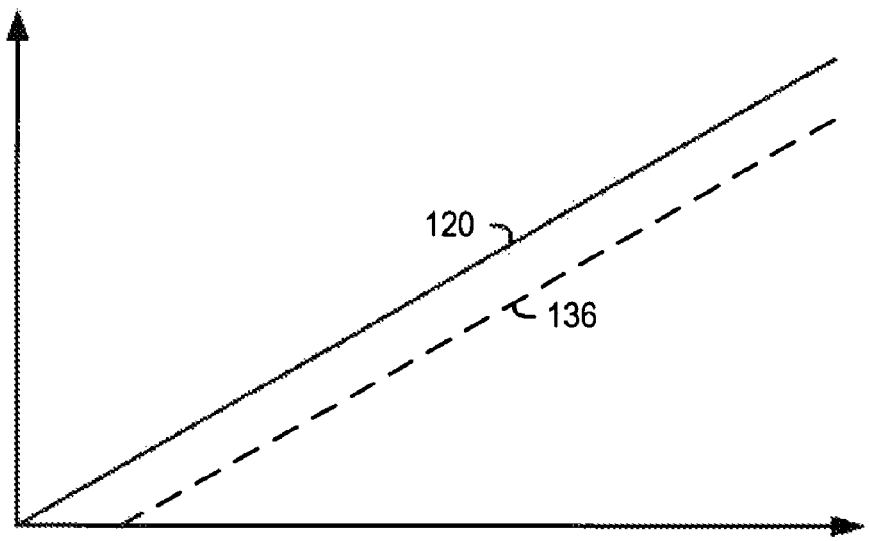

Referring now also to FIGS. 6A and 6B, graphs of the performance characteristics of the arrangement of FIGS. 4-5 are shown. In FIG. 6A, a binary ("critical/non-critical") importance ranking scheme is assumed to be employed. Accordingly, the transfer function 104 is non-linear and selects one of two thresholds depending on the health of the service 25.

Curve 120 represents the health of the service 25. Above a health level h1, the service 25 is considered to be healthy and it operates in a "green" mode of operation 124. Curve 122 represents the number of service requests that are permitted to be made to the service 25 based on the importance ranking relative to the health of the service 25. In this mode of operation, both critical and non-critical service requests are permitted to be made to the service 25. As a result of the normal operational health, the number of service requests that are permitted to be made to the service 25 is at a maximum.

When the health of the service 25 drops below the health level h1, the service 25 is considered to be less healthy and it operates in an "orange" mode of operation 126. In the orange mode of operation, all critical service requests are permitted, but non-critical service requests are not permitted. The probability that a given service request will be permitted thus depends on the level of importance of the service request. The service 25 is thereby protected from overload, but it is still permitted to provide responses to critical service requests and critical functionality is preserved.

The orange mode of operation also facilitates protection of a service 25 when the service 25 starts to become overloaded. That is, when a service 25 becomes overloaded, and program components 32 begin retrying service requests to the service 25, there may be a tendency for the service 25 to receive more load when it starts slowing down. In the orange mode of operation, when the health of the service 25 starts deteriorating, the number of retries is managed such that only the more critical retries are permitted. The reduction in permitted service requests may cause the health of the service 25 to improve due to the negative feedback discussed above in connection with FIG. 5. The critical service requests also continue to generate data relating to communications with the service 25. Such data may be used as historical statistics in the health algorithms described above in connection with step 82 to detect that the health of the service has improved. The service 25 may then, for example, return to the "green" mode of operation.

On the other hand, if the health of the service 25 drops below the health level h2, the service 25 is considered to be unhealthy and it operates in a "red" mode of operation 128. In the red mode of operation 128, the service 25 may be experiencing significant trouble (e.g., it has failed, or it is significantly overloaded and is about to fail). Accordingly, no service requests are permitted to be made to the service 25. If the service has failed, in an exemplary embodiment, rather than not permitting any service requests, a program component 32 is selected to make periodic test service requests to the service 25 until a connection with the service 25 is reestablished. The test service requests may be used to generate data relating to communications with the service 25. Such data may be used as historical statistics in the health algorithms described above in connection with step 82.

It may also be desirable to implement a hysteresis in the arrangement of FIG. 6A. For example, some hardware components may remain in one mode of operation longer than others such that a service 25 gradually shifts from one mode of operation to another. Such hysteresis may be implemented, for example, by configuring the program components 32 to use slightly different algorithms to implement the health computation.

In FIG. 6B, a continuous (e.g., floating point value) importance ranking scheme is assumed to be employed. Accordingly, the transfer function 104 may take a more linear form, and the number of service requests (curve 136) that are permitted to reach the service 25 may gradually increase or decrease as the health of the service 25 improves or deteriorates, respectively. In the arrangement of FIG. 6B, rather than just three modes of operation, the service 25 may have a potentially infinite number of modes of operation (in accordance with the number of different potential values for the importance ranking 56).

The arrangement of FIGS. 4, 5, and 6A-6B may also be used to protect services 25 to address what is sometimes referred to as "the cold cache problem" in the context of restart operations. For example, after a service 25 has failed, and then enters a start-up mode, a certain amount of time may be required for the service 25 to become fully operational. When the service 25 enters the start-up mode, the health of the service 25 may be considered to be poor (e.g., because it is not responding to service requests). As the service 25 comes back on-line, there may be a tendency to send many service requests to the service 25 at once, given that the service 25 has been off-line. Such an initial rush of service requests may create the potential for the service 25 to fail due to overloading. The arrangement described above protects the service 25, because the health of the service 25 is initially poor. As a result, the service 25 may start slowly, responding to only a limited number of service requests, and then ramp up as the health of the service 25 improves. Also, during this period, the service 25 starts by responding to the most critical service requests, and then gradually responds to less critical requests as it comes fully on-line. In another exemplary embodiment, (e.g., where a service 25 is not called very often), it may be desirable for the service 25 to be considered healthy until information is received to the contrary. In such an arrangement, the service 25 would be considered healthy on start-up.

Referring again to FIG. 3, the wait-time algorithm/parameter information 60 includes resource allocation time (RAT) configuration information 62 and failure expectation time (FET) configuration information 64 which are used by the service availability manager 30 to calculate a resource allocation time and a failure expectation time, respectively. The resource allocation time is configured to address the situation in which a service request may complete, but so slowly that simply waiting for the response may prevent the process 20 from producing its result within a desired time period, cause the cost of waiting to exceed the value of the results from the service 25, or even slow the process 20 down to such a degree that it cannot fulfill its critical purposes. The failure expectation time is configured to address the situation in which a service request may never complete. Thus, the use of a resource allocation time and failure expectation time allows these two separate scenarios to be addressed separately.

Figure 7:
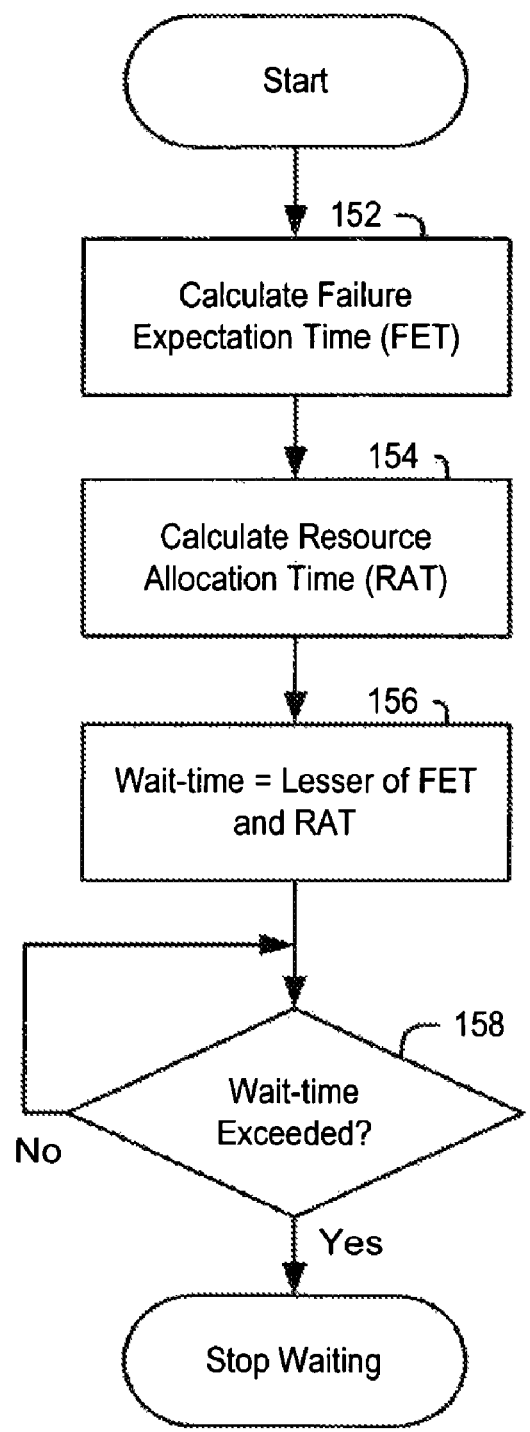
FIG. 7 is a flowchart showing operation of wait-time decision logic of FIG. 2.

Referring now to also FIG. 7, a flowchart showing operation of wait-time decision logic 52 is shown. At step 152 the failure expectation time is calculated. In an exemplary embodiment, the failure expectation time operates such that, if (i) a request was sent to a service 25, (ii) no response has been received, and (iii) the failure expectation time has been exceeded, then that means the service 25 has probably failed and the process 20 should stop waiting for a response. In an exemplary embodiment, the failure expectation is calculated as follows:

FET=max_successful_response+$n$-sigma where n-sigma is n times the standard deviation of the latency of the service 25 and max_successful_response is the maximum observed latency of a successful service request.

At step 154 the resource allocation time is calculated. In an exemplary embodiment, the resource allocation time operates such that, if the requested information is non-critical, then the process 20 should stop waiting for a response in time to finish generating the page (without the optional information) prior to expiration of the task deadline. (If the information is critical, then the requestor waits longer.) In an exemplary embodiment, the resource allocation time is calculated as follows:

RAT=if(serviceCallImportance=Critical), then critical_upper_bound else min(2-sigma, time remaining before task deadline).

In this example, if the importance of the service request is critical, then the process 20 waits until a critical upper bound is reached. The critical upper bound may be a value corresponding to the maximum amount of time it is desired to wait for a response critical service requests. The critical upper bound may be configured to expire, for example, just before the page timeout expires. If the importance of the service request is non-critical, then the process 20 waits twice as long as it would expect to wait for a response; but if the deadline for completing the task is about to expire, then the process 20 stops waiting. As will be appreciated, the "deadline" for completing the task may be a firm deadline, or may simply be a performance goal that may be missed.

At step 156, it is determined which of the failure expectation time and the resource allocation time is smaller. The wait-time is set equal to the lesser of the failure expectation time and the resource allocation time. Based on this determination, the process 20 then waits for the wait-time to expire. Once it is determined that the wait-time has expired (step 158), then the process 20 stops waiting for a response to the service request. Again, as noted above, the algorithm may be different for each different program component 32 and for each different service 25.

As previously indicated, in an exemplary embodiment, the process 20 may make many service requests to many services 25, such that the process 20 is waiting for many responses at the same time. In such situations, in an exemplary embodiment, step 158 may be performed using the longest wait-time of all of the critical service requests. Thus, for example, the wait-time for each of the critical service requests may be determined in steps 152-156, and then the longest wait-time of all of the service requests may be determined and used in step 158. As long as the process 20 is waiting for a critical service request, it may continue waiting for non-critical service requests as well, until a determination is made to abandon the critical service request (and all other service requests). On the other hand, if there is no critical information, then the wait-time may be determined to be zero. The task may then be completed without the optional information. Other approaches may be used as well.

Figure 8B:
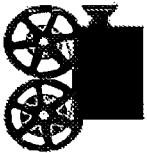

Referring now to FIGS. 8A-8C, another example showing operation of the system of FIG. 1 is shown. FIG. 8A is similar to FIG. 1, except that it is presented in the context of an example of a process 170 that is configured to construct web pages for a website. Also, in FIG. 8A, the service availability manager 30 is not shown for simplicity. FIGS. 8B-8C show exemplary web pages produced by the system of FIG. 8A in different scenarios.

The process 170 includes various program components 32 that send service requests to services 25 to obtain information to populate fields 172 of a web page template 174. Often, a given web page may have some central purpose and may have some information which is considered critical and some information which is considered optional. The information that is critical and the information that is optional depends on the purpose of the web page. In FIG. 8A, the fields 172 include a field 176 in which the requested information is critical, and the services 25 include a service 175 which is accessed to provide the critical information. For the remainder of the fields 172, the requested information has been designated has optional. Again, in FIG. 8A, the services 25 may be accessed in parallel.

The process 170 may have a deadline for completing the web page. For example, once the process 170 receives the request for a web page, it may have 1500 ms to construct the web page for publication to the visitor. During this time, the services 25 are accessed and information received from the services is used to populate the fields 172. Again, the deadline may be a firm deadline or merely a performance goal.

Figure 9:
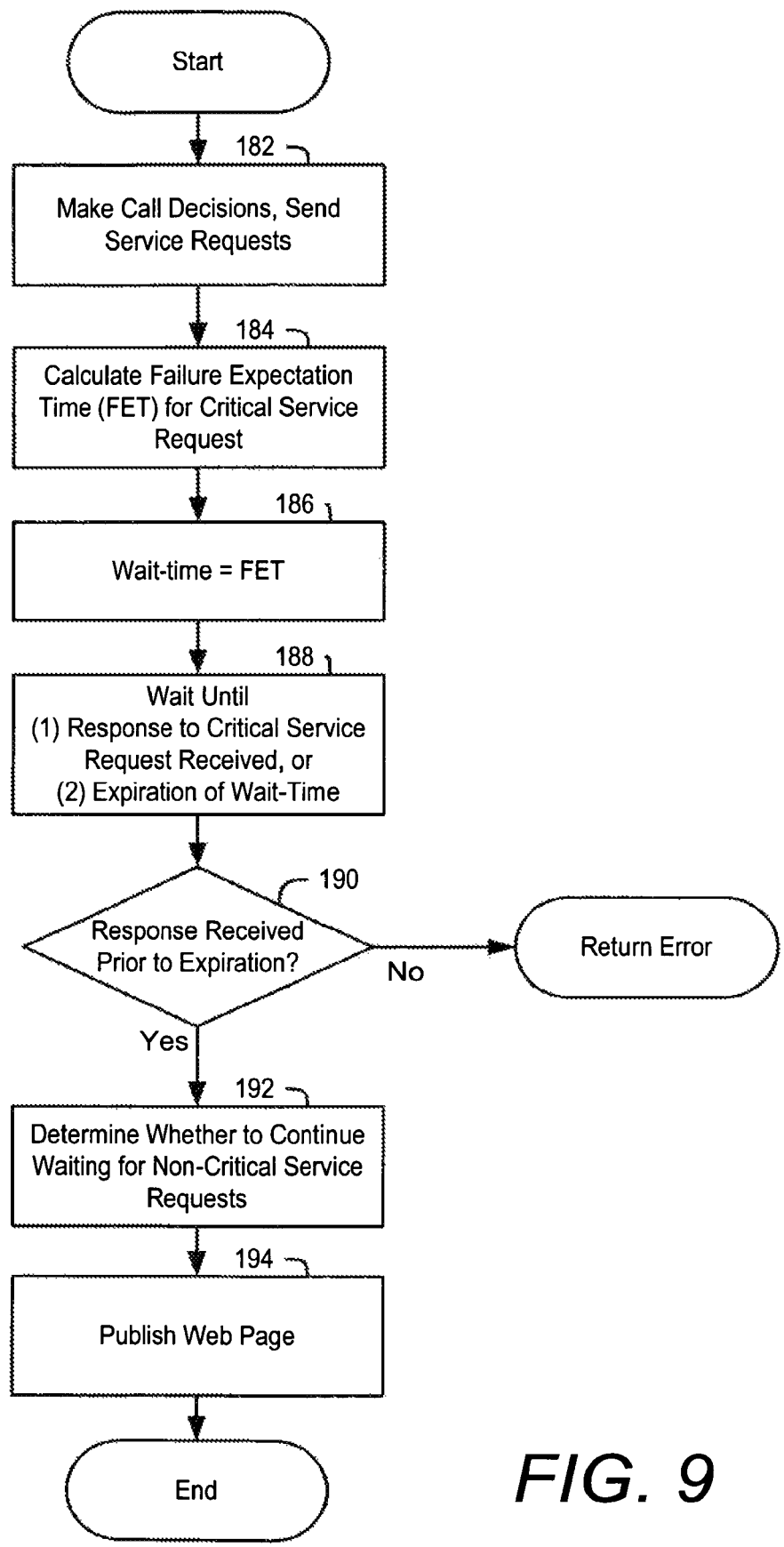
FIG. 9 is a flowchart showing operation of the system of FIG. 8A.

Referring now to FIG. 9, in operation, after the request to generate the web page has been received by the process 170, it is determined whether to send service requests to the services 25 (step 182). The decision whether to send the service requests may be made in accordance with the discussion above in connection with FIGS. 4, 5, 6A and 6B. For example, if one of the services 25 is not healthy, a decision may be made not to send the service request to the service in order to protect the service. In an exemplary embodiment, decision logic may be included to select an alternate service 25 to access to obtain substitute information for the information that was to be provided by an unhealthy service 25. In another exemplary embodiment, decision logic may be included to select alternate content to display. For example, with reference to FIG. 8A, if the service 25 that provides the information to populate Field 2 is unhealthy, then Field 2 may be populated with information from an alternate service 25 which provides information that is different than the information requested from the healthy service 25, e.g., to use one website to substitute for another website feature.

The process 170 then sends service requests to the services 25 for information to populate the fields 172. The information from the service 175 has been designated as critical and therefore the response time of the service 175 is of particular interest. As previously indicated, in an exemplary embodiment, the wait-time calculations for the non-critical service request may be subordinated to the wait-time calculation for the critical service request. The failure expectation for the critical service request is then calculated (step 184). If the wait-time decision logic 52 is configured in the manner discussed above in connection with FIG. 7, then the wait-time is set equal to the failure expectation time (step 186). This is because the resource allocation time is set to infinity if the service request is critical, and therefore is not less than the failure expectation time (FIG. 7, step 156).

Next, either a response to the critical service request is received prior to the expiration of the wait-time, or the wait-time expires and no response to the critical service request has been received (steps 188, 190). If a response is received, then a determination may be made whether to continue waiting for the non-critical service requests (step 192). For example, if the service 175 responds with the requested information in advance of the deadline for completing the web page, a decision may be made to forego the other non-critical information and publish the web page ahead of schedule (e.g., to make the website faster). Alternatively, a decision may be made to wait until the expiration of the deadline for completing the web page before foregoing the non-critical information. In an exemplary embodiment, this decision is made on a service request by service request basis in the wait-time algorithm/parameter information 60 for each service request. In another exemplary embodiment, this decision may be made on a web page by web page basis by part of the program logic of the process 170. If the failure expectation time of the critical service request is reached after the expiration of the deadline for completing construction of the web page, and if a response to a critical service request is received after the deadline, then the process 170 may continue to wait for the results of the non-critical service requests during this time period, even though the individual wait-times for these service requests have expired (e.g., when the page deadline expired). After any additional information is obtained from non-critical service requests, the web page is published at step 194.

If the wait-time of the critical service request expires before a response is received; then the non-critical service requests may be abandoned as well (e.g., if there is little or no value to the web page without the critical information) and an error may be returned (step 196). In another exemplary embodiment, the non-critical service requests may be given until the expiration of their own individual wait-times to return their responses (e.g., if there is still value to the web page without the critical information). Again, this may be configured on a web page by web page basis.

FIGS. 8B-8C show renderings of screen shots of web pages as presented to a visitor of an on-line retail website when a particular service is healthy and when the service is in a degraded performance mode, respectively. The web pages in FIGS. 8B-8C may be generated using the system of FIG. 8A. In FIG. 8B, the service 25 that provides the information used to populate field 178 is assumed to be healthy. For example, the service 25 may be a service that identifies the visitor based on a unique browser ID or in some other manner. In the example screen shot, the information is used to generate a custom welcome message that is displayed to the visitor. The custom welcome message is shown to include a product recommendation targeted specifically to the visitor, e.g., based on information gathered during previous visits by the visitor. In the illustrated case, the custom welcome message relates to a special offer on accessories (custom manufactured 8-Track tapes) for a previous purchase made by the visitor (a novelty 8-Track tape player). As will be appreciated, the service 25 may itself access, other services in generating the product recommendation based on the visitor's identity.

In FIG. 8C, the service 25 that provides the information used to populate field 178 is assumed to be in a degraded performance mode. In the context of FIG. 8C, the visitor's identity is assumed to be useful (e.g., to generate the custom welcome message) but not critical (e.g., as compared to for use in generating a checkout page). Accordingly, the service request is not permitted to be made to the service 25 and, therefore, as shown in FIG. 8C, a generic welcome message is provided that is not customized to the visitor. There is thus a graceful degradation of the service 25 which frees it from having to respond to service requests that are not considered important so that it can continue to respond to service requests that are considered important.

In the example of FIG. 9, a binary importance ranking scheme is utilized. If a continuous (e.g., floating point value) importance ranking scheme is utilized, the process of FIG. 9 may be modified. For example, instead of making decisions based on whether critical information has been received, decisions may be made based on the aggregate importance of the information received. For example, if the aggregate importance of the information that has been received falls below a threshold, an error may be returned at step 196. Also, the wait-time may be calculated, for example, as a weighted-average of the wait-times of the individual service requests (i.e., in accordance with the relative importance of the service requests).

In an exemplary embodiment, the fields 172 are rendered (e.g., by generating HTML) in an order which is determined based on the location of the field 172 on the web page. In another exemplary embodiment, the fields 172 are rendered in an order which is dynamically determined. For example, in an exemplary embodiment, the fields 172 may be rendered in an order which is dynamically determined based on which responses have been received from the services 25 and, correspondingly, which fields 172 have had the requisite data collected such that the particular field 172 may be rendered. For example, in the arrangement of FIGS. 8A-8C and 9, the system 10 may be configured to track which program components 32 transmit service requests to which services 25 in connection with collecting the data needed to populate the fields 172. This information may then be used to perform a dependency analysis to determine, for each of the fields 172, which responses need to be received in order to have the data to needed render each field 172. Based on this analysis, the fields 172 may then be rendered in an order that is determined based on the order in which responses are received. For example, the program process 20 may determine whether to begin working on rendering a particular field 172 based on whether the complete set of data needed to render the field 172 is available. This allows the web page to be generated more quickly. As the program process 20 is waiting to receive a response from one or more of the services 25 in connection with certain fields, it can, in parallel, begin work on rendering certain other fields for which the requisite data has already been received. In another exemplary embodiment, the fields 172 may be rendered in an order which is dynamically determined based on the amount of time required to render the different fields 172. For example, the process used to render some of the fields 172 may involve multiple service requests, e.g., by using the results of one service request to make another service request. In such instances, it is desirable to begin the rendering of such fields first, because such fields will require the most time to complete (e.g., as compared to fields where only a service request is required). Thus, the rendering of fields that require more time to render may be initiated before the rendering of fields that require less time to render. Again, although described in the context of generating a web page, it will be appreciated that this arrangement may also be used in other contexts where the program process 20 is configured to perform some other task besides generating a web page.

In an exemplary embodiment, a retry mechanism may be implemented which takes into account whether a service request is considered critical. That is, if a service request is considered critical, but returns an error, then another service request may be sent to the service 25. On the other hand, if a service request is non-critical, then another service request is not sent to the service 25. This provides a second opportunity to obtain critical information, but avoids overburdening potentially unhealthy services 25 with requests for information that is non-critical.

In another embodiment, metrics may be maintained concerning the performance of a visit to a website. For example, if multiple errors are returned to a visitor during a visit, one or more of the settings of the system 10 may be modified to increase the likelihood of pages being returned without errors in order to prevent the visitor from becoming frustrated and leaving the website.

As will be appreciated, load balancing and request routing techniques may be used in which each service 25 is implemented on multiple hardware components. That is, each service 25 may appear to be hosted on a single hardware component from the perspective of the process 20, but in fact the service 25 is hosted on multiple hardware components ("endpoints"). For example, service requests may be sent by client processes to a virtual IP address which maps to multiple endpoints, and load balancers may be used which distribute the service requests amongst the multiple endpoints. In such a scenario, service health may be monitored for each of the endpoints individually or for the group of endpoints in the aggregate. As will be appreciated, a tradeoff may exist in the benefits achieved by the more fine-tuned health management and the increased overhead that results from the more fine-tuned health management.

As will be appreciated, the system described herein may be used both in connection with local processes and remote processes. In the context of a remote process, a service request may be received from a remote process by way of a network, such as the Internet. For example, the services 25 may be offered as web services that are accessible to the remote process through an application programming interface (API) across the Internet. Such service requests may be made by third parties, for example, to assist in the construction of their own web pages (e.g., by obtaining information from the services 25 and using the information to populate externally-generated web pages). Thus, for example, in FIG. 8A, the program process 170 and one or more of the services 25 may be remote, with at least one of the services 25 (e.g., service 175) being local. In such an embodiment, the health of the service 175 may be controlled as described herein, even if other aspects of the web page generation (e.g., wait-time decisions) are under third-party control. The remote processes may also make service requests for other reasons apart from generating web pages, for example, in situations where the remote system is not used to implement a web site. In the context of third party service requests, it may be desirable to assign a quota of service requests (e.g., the external client is permitted to make one-hundred service requests per second) as described above. Such an arrangement may be used to protect the service in situations where the external client is susceptible to not following predictable patterns of behavior.

The invention is described above with reference to drawings. These drawings illustrate certain details of specific embodiments that implement the systems and methods and programs of the present invention. However, describing the invention with drawings should not be construed as imposing an the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the invention are described in the general context of method steps which may be implemented in one embodiment by a program product including machine-executable instructions, such as program code, for example, in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present invention may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, servers, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules, and other data for the computer.

It should be noted that although the flowcharts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with standard programming techniques with rule based logic and, other logic to accomplish the various database searching steps, correlation steps, comparison steps and decision steps.

It should also be noted that the word "component" as used herein and in the claims is intended to encompass implementations using one or more lines of software code, and/or hardware implementations, and/or equipment for receiving manual inputs.

The foregoing description of embodiments of the invention have been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A computer-implemented method, executed in a computing system executing code, for processing data in a service framework, comprising:
   receiving an assessment of a relative state of health of a service;
   receiving an assessment of a relative importance of the service to a task being performed; and
   determining whether to continue to wait for a response from the service to a request sent to the service, wherein determining whether to continue to wait for a response from the service is based on the assessments of relative state of health and relative importance of the service, wherein a request for service with a lower relative importance is waited upon as long as a request for a service with a higher relative importance is being waited upon.

2. The computer-implemented method of claim 1, wherein determining whether to continue to wait is based on a classification of the request and a relative state of health of the service.

3. The computer-implemented method of claim 2, wherein a first classification corresponds to requests made to the service from the task when the relative state of health of the service is assessed as low and the relative importance of the service is assessed as low.

4. The computer-implemented method of claim 3, wherein a second classification corresponds to requests to be made to the service when the relative state of health of the service is assessed as low and the relative importance of the service is assessed as high, wherein the first classification is less than or equal to the second classification.

5. The computer-implemented method of claim 4, wherein a third classification corresponds to requests to be made to the service when the relative state of health of the service is assessed as high, wherein the second classification is less than or equal to the third classification.

6. The computer-implemented method of claim 1, wherein the relative state of health of a service is determined based on response times taken by the service to respond to prior service requests.

7. The computer-implemented method of claim 1, wherein the relative state of health of a service is determined based on a number of service requests unanswered by the service during a preceding time period.

8. The computer-implemented method of claim 1, wherein the relative importance of the service is manually specified.

9. The computer-implemented method of claim 1, wherein determining whether to continue to wait comprises calculating a resource allocation and a failure expectation time.

10. The computer-implemented method of claim 9, wherein the resource allocation time is calculated based on information regarding the relative importance of the service and based on an amount of time remaining before expiration of a deadline for completing the task.

11. The computer-implemented method of claim 9, wherein the failure expectation time is calculated based on the relative health of the service and is configured to provide a metric for determining when the service has likely failed.

12. The computer-implemented method of claim 1, wherein determining whether to continue to wait is further performed based on a deadline for completing the task.

13. The computer-implemented method of claim 1, wherein the task is constructing a web page for publication to a visitor of a website.

14. The computer-implemented method of claim 1, wherein the assessment of the relative state of health of the service is performance information concerning the response time of the service.

15. The computer-implemented method of claim 1, wherein the relative importance is specified as a continuous value.

16. A system including a memory and a processor providing services comprising:
an interface component to transmit service requests to a plurality of service and to obtain responses thereto; and
a processing component configured to obtain an assessment of a relative state of health of a requested service and an assessment of a relative importance of the requested service to a task being performed, wherein the processing component determines whether to continue to wait for a response from the service based on the assessments of relative state of health and relative importance of the service, wherein a request for service with a lower relative importance is waited upon as long as a request for a service with a higher relative importance is being waited upon.

17. A system as recited in claim 16, wherein the importance ranking is specified as a continuous value and the number of the plurality of modes of operation is potentially infinite.

18. A system as recited in claim 16, wherein the relative state of health of a service is determined based on response times taken by the service to respond to prior service requests.

19. The system as recited in claim 16, wherein the relative state of health of a service is determined based on a number of service requests unanswered by the service during a preceding time period.

20. The system as recited in claim 16, wherein the relative importance of the service is manually specified.

21. The system as recited in claim 16, wherein the processing component determines whether to continue to wait comprises calculating a resource allocation and a failure expectation time.

22. A computer-implemented method, executed in a computing system executing code, for processing data in a service framework, comprising:
receiving an assessment of a relative state of health of a service;
receiving an assessment of a relative importance of the service to a task being performed; and
managing the pendency of outstanding service request responses based according to the assessments of relative state of health and relative importance of the service, wherein a request for service with a lower relative importance is maintained upon as long as a request for a service with a higher relative importance is being waited upon.

23. The computer-implemented method of claim 22, wherein the relative state of health of a service is determined based on response times taken by the service to respond to prior service requests.

24. The computer-implemented method of claim 22, wherein the relative state of health of a service is determined based on a number of service requests unanswered by the service during a preceding time period.

25. The computer-implemented method of claim 22, wherein the relative importance of the service is manually specified.

26. The computer-implemented method of claim 22, wherein determining whether to continue to wait comprises calculating a resource allocation and a failure expectation time.

27. The computer-implemented method of claim 26, wherein the resource allocation time is calculated based on information regarding the relative importance of the service and based on an amount of time remaining before expiration of a deadline for completing the task.

28. The computer-implemented method of claim 27, wherein the failure expectation time is calculated based on the relative health of the service and is configured to provide a metric for determining when the service has likely failed.

29. The computer-implemented method of claim 22, wherein determining whether to continue to wait is further performed based on a deadline for completing the task.

30. The computer-implemented method of claim 22, wherein the task is constructing a web page for publication to a visitor of a web site.

31. The computer-implemented method of claim 22, wherein the assessment of the relative state of health of the service is performance information concerning the response time of the service.

32. The computer-implemented method of claim 22, wherein the relative importance is specified as a continuous value.

* * * * *